US012639264B2

(12) United States Patent
Dugast et al.

(10) Patent No.: US 12,639,264 B2
(45) Date of Patent: *May 26, 2026

(54) APPARATUS, SYSTEM AND METHOD TO SAMPLE PAGE TABLE ENTRY METADATA BETWEEN PAGE WALKS

(71) Applicant: Intel Corporation, Santa Clara, CA (US)

(72) Inventors: Francois Dugast, Karlsruhe (DE); Neha Pathapati, San Jose, CA (US); Durgesh Srivastava, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 17/485,203

(22) Filed: Sep. 24, 2021

(65) Prior Publication Data

US 2022/0012209 A1 Jan. 13, 2022

Related U.S. Application Data

(63) Continuation-in-part of application No. 17/479,702, filed on Sep. 20, 2021, now abandoned.

(51) Int. Cl.
*G06F 16/16* (2019.01)

(52) U.S. Cl.
CPC .................................. *G06F 16/164* (2019.01)

(58) Field of Classification Search
CPC ............. G06F 12/1009; G06F 12/0238; G06F 12/0833; G06F 12/0882
See application file for complete search history.

(56) References Cited

U.S. PATENT DOCUMENTS

| | | | | |
|---|---|---|---|---|
| 5,727,150 A | * | 3/1998 | Laudon ................. | G06F 12/122 709/215 |
| 2016/0378655 A1 | * | 12/2016 | Blagodurov ........ | G06F 12/0811 711/122 |
| 2018/0081816 A1 | * | 3/2018 | Coburn ............... | G06F 12/0868 |
| 2022/0100668 A1 | * | 3/2022 | Blagodurov ........ | G06F 12/0815 |
| 2022/0179799 A1 | * | 6/2022 | Erickson ............. | G06F 12/0882 |

OTHER PUBLICATIONS

Merigot, Alain et al. "What is happening during "table walk"?" Stack Exchange. Published Nov. 9, 2019. <https://cs.stackexchange.com/questions/102834/what-is-happening-during-table-walk>. (Year: 2019).*

(Continued)

*Primary Examiner* — Kenneth M Lo
(74) *Attorney, Agent, or Firm* — Alliance IP, LLC

(57) ABSTRACT

An apparatus of a computing system, the computing system, a method to be performed at the apparatus, and a machine-readable storage medium. The apparatus includes control circuitry to: perform a page walk operation on a page table structure of a pooled memory; based on the page walk operation, determine page table entries (PTEs) corresponding to a workload to be executed by the computing system; and during a time interval not including a page walk operation by the control circuitry, perform a plurality of sampling operations, individual ones of the sampling operations including determining PTE metadata corresponding to at least some of the PTEs.

20 Claims, 6 Drawing Sheets

Walking the Page Table to Save PTE Pointers

(56)           References Cited

OTHER PUBLICATIONS

"File:X86 Paging PAE 4K.svg," Wikipedia, as accessed Dec. 20, 2021 at https://en.wikipedia.org/wiki/File:X86_Paging_PAE_4K. svg, 4 pages.

Martin, Dylan, "IBM: Power10 CPU's 'Memory Inception' Is Industry's 'Holy Grail'," CRN.com, Aug. 17, 2020, as accessed Dec. 20, 2021 at https://www.crn.com/news/components-peripherals/ ibm-power10-cpu-s-memory-inception-is-industry-s-holy-grail-? itc= refresh, 6 pages.

* cited by examiner

Locked Page Table Structure During Page Walk

Walking the Page Table to Save PTE Pointers

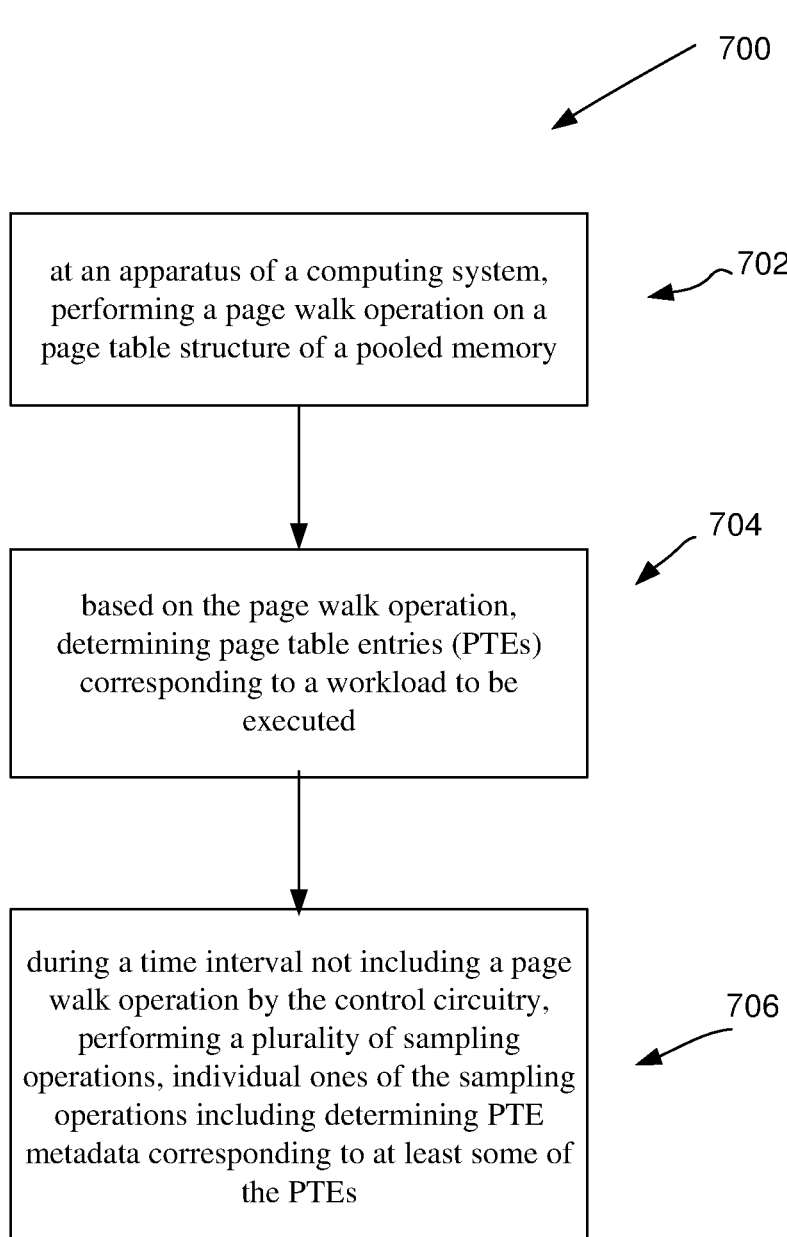

700 at an apparatus of a computing system, performing a page walk operation on a page table structure of a pooled memory

702 based on the page walk operation, determining page table entries (PTEs) corresponding to a workload to be executed

704 during a time interval not including a page walk operation by the control circuitry, performing a plurality of sampling operations, individual ones of the sampling operations including determining PTE metadata corresponding to at least some of the PTEs

APPARATUS, SYSTEM AND METHOD TO SAMPLE PAGE TABLE ENTRY METADATA BETWEEN PAGE WALKS

CROSS REFERENCE TO RELATED APPLICATIONS

This application is a continuation-in-part of U.S. application Ser. No. 17/479,702 filed Sep. 20, 2021, entitled APPARATUS, SYSTEM AND METHOD TO SAMPLE PAGE TABLE ENTRY METADATA BETWEEN PAGE WALKS, the contents of which are disclosed herein in its entirety.

FIELD

The present disclosure relates in general to the field of computer development, and more specifically, to memory pooled architectures involving the sampling of page table entries.

BACKGROUND

Scale-out and distributed architectures increase computing resources or available memory or storage by adding processors, memory, and storage for access using a fabric or network. Disaggregated memory architectures rely on pools of memory, located remotely from the compute nodes in the system. A memory pool can be shared across a rack or set of racks in a data center.

Memory pooling provides a way for multiple computing platforms to map and use memory from a memory pool on an as needed basis. Memory pooling provides the ability for systems to efficiently handle situations in which there are spikes in memory capacity needs. As just one example, at the end of a payroll period, a system may run resource intensive database queries which require large amounts of memory capacity. Instead of having to overprovision memory to handle this worst case scenario, the system could alternatively leverage memory available in the memory pool for this purpose.

BRIEF DESCRIPTION OF THE DRAWINGS

FIG. 7 illustrates a flow for a process according to some embodiments.

Like reference numbers and designations in the various drawings indicate like components.

DETAILED DESCRIPTION

Figure 1:
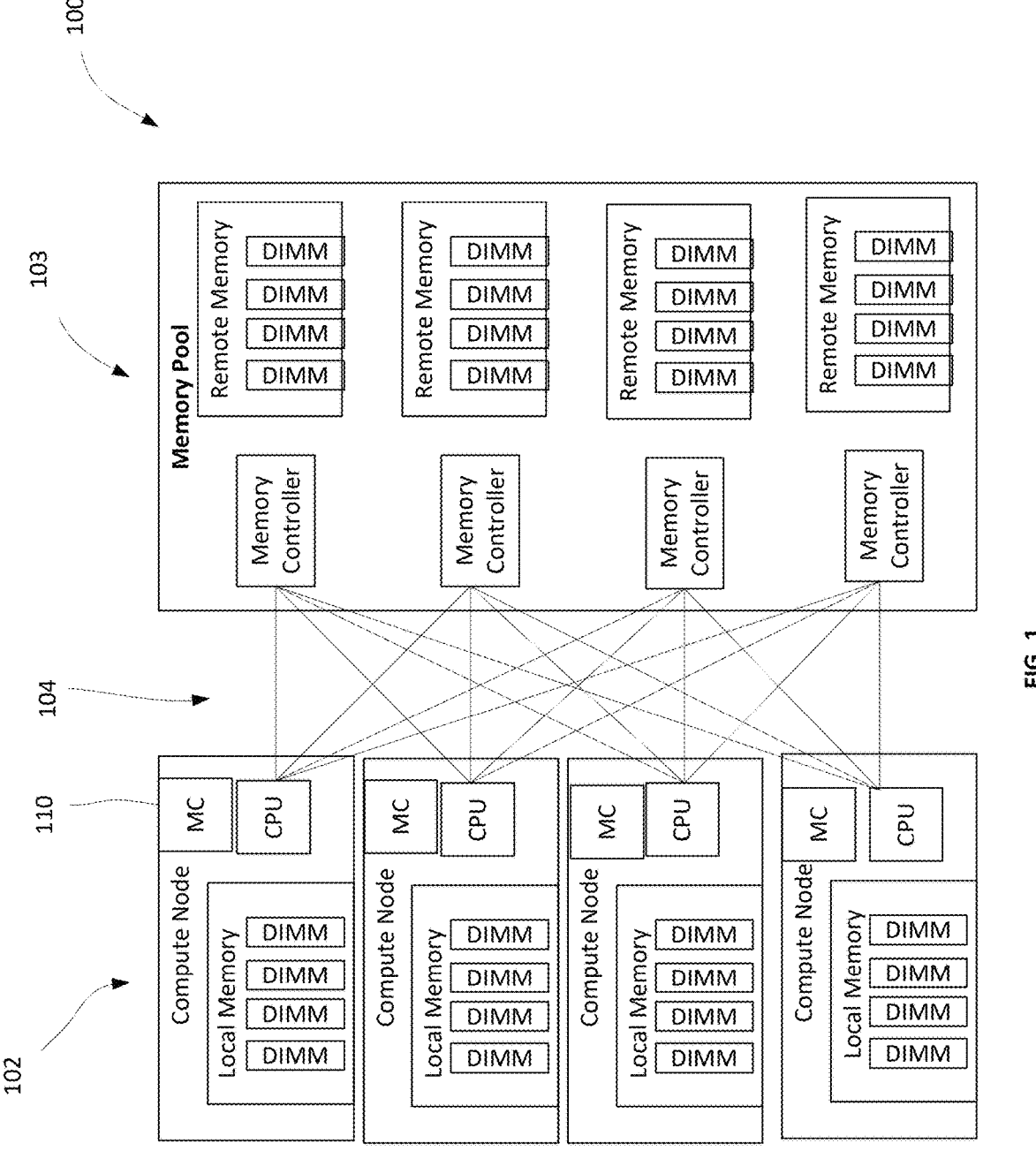
FIG. 1 illustrates a network architecture of a pooled memory environment.

Memory pooling may be used in a wide variety of domains, including domains in which it is important to be efficient with resource provisioning. This may include domains such as edge computing, in which power may be conserved by using a memory pool to improve efficiency, and cloud computing, in which memory capacity heavy instances tend to be very expensive relative to use of a memory pool. Various use cases that may utilize memory pooling include factory automation processes, autonomous vehicles, robotics, and augmented reality applications, among others.

In pooled memory architectures, "near memory" or "local memory" as used herein refers to a system memory of a local physical platform (such as a computing device/computing system), that is, the memory circuitry of a local physical system or local platform, whereas "remote memory" as used herein refers to "disaggregated memory", that is, addressable regions of memory that are connectable to a local platform by one or more fabrics, interconnects, or networks).

Memory pooling is expected to gain adoption in a wide variety of domains, including domains where it is important to be efficient with resource provisioning. As noted previously, such domains may include edge computing, where it is important to conserve power and to be efficient with time and memory resources, and cloud computing, where heavy instances of memory capacity tend to be very expensive, and renting such memory capacity tends to be cost inefficient when compared to using a memory pool.

While memory pooling provides an important means to scale memory capacity on demand for many applications that are memory intensive, and need more memory capacity, it becomes important to ensure that the requirements for these applications are met by the pool. The local or near memory offers better performance than the pooled memory, a component of which may include the remote memory. Limiting the impact caused by higher memory latency in the pool requires smart placement of hot memory in the near memory. Hot memory detection relies on sampling PTEs, for example to read PTE metadata in order to determine accesses to the memory pages associated with the PTEs that are sampled. Current implementations are intrusive as they require, for each page walk, locking system structures used by a workload to be executed by a local compute node, thus causing a performance impact.

PTE metadata may include information such as one or more page flags, including, by way of example, a young flag, a dirty flag, an idle flag, a read flag, a write flag, a present flag, etc. PTE metadata may include, according to some embodiments, any information regarding the data stored in the pooled memory that corresponds to the PTE.

In certain memory architectures, pooled memory may span over 1.5 million memory pages. With existing solutions, sampling accesses to the pages requires walking through the page table structure of the pooled memory to sample page table entries (PTEs), which may take an absolute time of 380-440 ms for each iteration, with a performance impact to benchmark being about 5%. Sampling a PTE may include reading PTE metadata corresponding to the PTE.

Various embodiments include pooled memory architectures that leverage control circuitry of a compute node, such as a memory controller circuitry of the compute node, in order to achieve efficiencies with respect to memory access logic in a pooled memory environment. In various embodiments, control circuitry of a local compute node is to sample page table entries (PTEs) of a page table structure more often than it walks the page table structure. Since there are less page table structure walks than sampling operations, locking instances of the page table structure can be advantageously reduced. In this manner, memory access latencies are decreased and workload performance efficiency is increased for compute nodes using the pooled memory corresponding to the page table structure.

By avoiding a page walk each time PTE metadata is needed, such as young flags to determine PTE hotness in order to make a determination with respect to placement of data corresponding to the PTEs at either the local memory or the remote memory, advantageously, some embodiments allow multiple PTE samplings from the local memory/system memory in order to retrieve PTE metadata in between periodic page walks by the memory controller. The local storage of PTE metadata after a page walk cuts down on the time necessary to retrieve the needed metadata, and hence makes execution of a workload much more efficient than mechanisms of the prior art.

FIG. 1 provides an example embodiment of computing system 100 within which some embodiments may be implemented.

Referring first to FIG. 1, computing system 100 includes a plurality of compute nodes 102 and a memory pool or pooled memory 103 communicatively coupled to the compute nodes 102 by way of a connections 104. Connections 104 may, for example, include a fabric, and computing system 100 may represent a portion of a data center, where connections 104 make up a portion of the data center fabric. Each of the compute nodes may include a processor, such as a CPU, local memory, including, for example, a number of duel in-line memory modules (DIMMs), and a memory controller or memory controller circuitry (MC) 110, with the MC 110 providing control over memory operations associated with memory operations for a workload to be executed by the CPU. The memory pool may includes a number of remote memories each including, by way of example, a number of DIMMs, and a memory controller to control memory operations on the DIMMs. Although DIMMs are shown in FIG. 1, embodiments are not so limited, and encompass any type of memory device to be used for the local memories and for the remote memories. The remote memories may comprise any suitable types of memory and are not limited to a particular speed, technology, or form factor of memory in various embodiments. For example, a remote memory may comprise one or more disk drives (such as solid-state drives), memory cards, memory modules (e.g., dual in-line memory modules) that may be inserted in a memory socket, or other types of memory devices.

A workload may be executed by a processor of a compute node 102, such as a CPU, to perform any suitable operations (such as operations associated with any of the use cases described above or other suitable operations). The workload may be associated with application code that is executed by a compute node 102. In various embodiments, the application code may be stored within memory the local memory of a compute node, and/or within the pooled memory. The pooled memory (may include one or more of the local memories of the compute nodes, and additional memory of the system not on the compute nodes).

Execution of the workload may include executing various memory flows, where a memory flow may comprise any number of reads from or writes to memory.

In various embodiments, processor-addressable or pooled memory for the system includes both near (local) memory as well as remote memory. That is, a workload that is executable by a processor of a compute node may request memory access using a virtual address that may refer a location in the pooled memory that is local to a given compute node or to memory that is remote from the given compute node (e.g., a remote memory, which may include local memories of other compute nodes 102, and/or other memory of the computing system 100 that is not part of the given compute node).

In the embodiment depicted, the memory associated with different types of memory flows is referenced by an address space of the pooled memory according to different ranges (e.g., a range may comprise consecutive virtual addresses bounded by a starting virtual address and an ending virtual address) associated with the types of memory flows. The physical memory addresses corresponding to the virtual addresses in the address space may be included within local memory of the compute nodes 102 and/or within remote memory. When a memory controller receives a request specifying a virtual address in the address space, the memory controller may process the request based on the specific address space that contains the virtual address.

The operating system of a compute node may identify memory characteristics or information regarding various memory ranges and may optimize the physical location of memory pages based on access frequencies for those memory pages. Such memory characteristics may, for example, correspond to PTE metadata. The PTE for the date at the given page may provide information regarding, for example, the frequency with which that page (the data) has been accessed, for example through a PTE flag called a "young flag" For example, for memory pages that are accessed relatively frequently over time, the operating system may direct that the memory pages be moved from a remote memory pool or remote memory 106 to a memory local to the compute node 102, or near local memory 130. As another example, pages with lower predicted access frequency may be pushed from a local memory to remote memory.

Memory controllers, or memory controller circuitries for the memory pool may control the flow of data going to and from one or more memories. A memory controller circuitry as shown in FIG. 1 may include logic operable to read from a memory, write to a memory, or to request other operations from a memory. In various embodiments, a memory controller circuitry may receive write requests from a workload and may provide data specified in these requests to a memory for storage therein. A memory controller circuitry may also read data from a memory and provide the read data to a workload. During operation, a memory controller circuitry may translate virtual addresses supplied by a workload to physical addresses and may issue commands including one or more physical addresses of a memory in order to read data from or write data to memory (or to perform other operations).

The pooled memory or memory pool 103 may store any suitable data, such as data used by one or more workloads to provide the functionality of a compute node 102. In some embodiments, the pooled memory may store data and/or sequences of instructions that are executed by processor cores of the compute node 102. In various embodiments, the pooled memory may store temporary data, persistent data (e.g., a user's files or instruction sequences) that maintains its state even after power to the pooled memory is removed, or a combination thereof. A pooled memory may store metadata along with the stored data, the metadata including formation regarding the data, such as noted previously. The pooled memory may be dedicated to a particular compute node 102 or shared with other compute nodes 102 of computing system 100.

In various embodiments, a pooled memory 103 may include any number of memory partitions and other supporting logic (not shown). A memory partition may include non-volatile memory and/or volatile memory.

Non-volatile memory is a storage medium that does not require power to maintain the state of data stored by the medium, thus non-volatile memory may have a determinate state even if power is interrupted to the device housing the memory. Nonlimiting examples of nonvolatile memory may include any or a combination of: 3D crosspoint memory, phase change memory (e.g., memory that uses a chalcogenide glass phase change material in the memory cells), ferroelectric memory, silicon-oxide-nitride-oxide-silicon (SONOS) memory, polymer memory (e.g., ferroelectric polymer memory), ferroelectric transistor random access memory (Fe-TRAM) ovonic memory, anti-ferroelectric memory, nanowire memory, electrically erasable programmable read-only memory (EEPROM), a memristor, single or multi-level phase change memory (PCM), Spin Hall Effect Magnetic RAM (SHE-MRAM), and Spin Transfer Torque Magnetic RAM (STTRAM), a resistive memory, magnetoresistive random access memory (MRAM) memory that incorporates memristor technology, resistive memory including the metal oxide base, the oxygen vacancy base and the conductive bridge Random Access Memory (CB-RAM), a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory.

Volatile memory is a storage medium that requires power to maintain the state of data stored by the medium (thus volatile memory is memory whose state (and therefore the data stored on it) is indeterminate if power is interrupted to the device housing the memory). Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (double data rate version 3, original release by JEDEC (Joint Electronic Device Engineering Council) on Jun. 27, 2007, currently on release 21), DDR4 (DDR version 4, JESD79-4 initial specification published in September 2012 by JEDEC), DDR4E (DDR version 4, extended, currently in discussion by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WI02 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5, originally published by JEDEC in January 2020, HBM2 (HBM version 2), originally published by JEDEC in January 2020, or others or combinations of memory technologies, and technologies based on derivatives or extensions of such specifications.

Although not depicted, a component or device of system 100 (e.g., any of compute nodes 102) may use a battery and/or power supply outlet connector and associated system to receive power or a display to output data provided by a processor. In various embodiments, the battery, power supply outlet connector, or display may be communicatively coupled to a processor (e.g., of compute node 102). Other sources of power can be used such as renewable energy (e.g., solar power or motion based power).

Although CPUs are depicted in the compute nodes of FIG. 1, a compute node may include any suitable processor (i.e. one or more processors), such as a microprocessor, an embedded processor, a digital signal processor (DSP), a network processor, a handheld processor, an application processor, a co-processor, an SOC, or other device to execute code (e.g., software instructions).

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

In various embodiments, the processing elements of a processor of a compute node may also include one or more arithmetic logic units (ALUs), floating point units (FPUs), caches, instruction pipelines, interrupt handling hardware, registers, or other hardware to facilitate the operations of the processing elements.

A pooled memory may be referenced by PTEs that point to the pooled memory.

The devices, architectures and networks shown in FIG. 1 may be used to implement methods or flows according to some embodiments. One or more components of FIG. 1 may be referenced below in the description of one or more embodiments.

Figure 2:
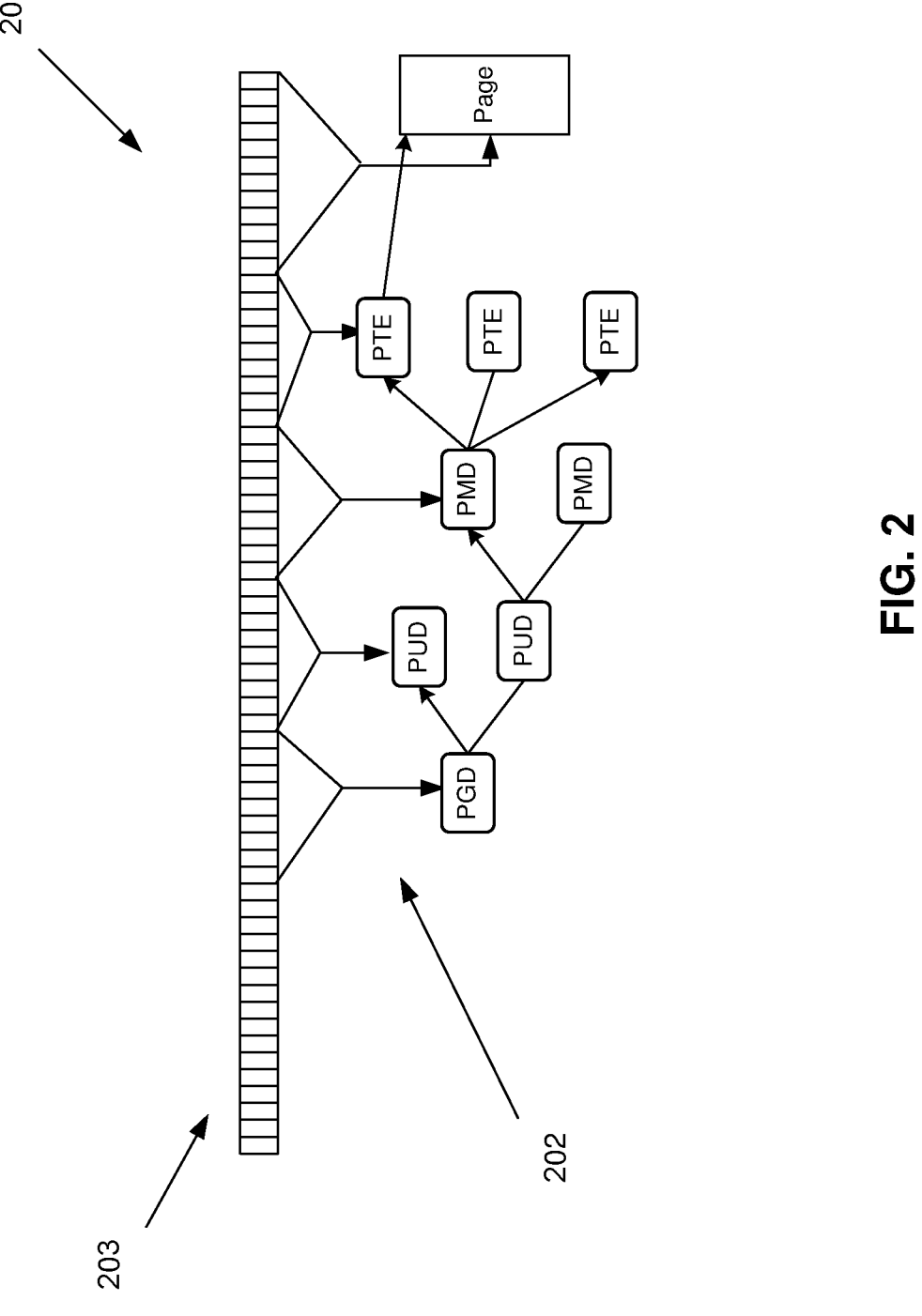
FIG. 2 illustrates a page table structure for a 64-bit virtual address along with a example flow for a page walk operation thereon.

Reference is now made to FIG. 2, which shows a page table structure 200 for a 64-bit virtual address, as may be used in the context of some example embodiments. The page table structure 200 is provided merely as an example, and is not meant to be limited to types or sizes of pages table structures that may be used in embodiments. A page table maps a virtual memory address in an address space, such as an address space of the pooled memory 103, to the physical address where the data is actually stored. It may include a linear array indexed by the virtual address (e.g. by the page-frame-number portion of that address) and yielding the page-frame number of the associated physical page. Because, in many cases, processes do not use the full available virtual address space, even on 32-bit systems, and certainly not on 64-bit systems, the address space tends to be sparsely populated and, as a result, much of that array would go unused. A solution to the latter issues has been to turn the linear array indexed by the virtual address into a sparse tree representing the address space, such as tree 202.

The row 203 of boxes across the top of FIG. 2 represents the bits of a 64-bit virtual address. To translate that address, the hardware splits the address into several bit fields. Note that, in the scheme shown here (corresponding to how the x86-64 architecture uses addresses), the uppermost 16 bits are discarded; only the lower 48 bits of the virtual address are used. Of the bits that are used, the nine most significant (bits 39-47) are used to index into the page global directory (PGD); a single page for each address space. The value read there is the address of the page upper directory (PUD); bits 30-38 of the virtual address are used to index into the indicated PUD page to get the address of the page middle directory (PMD). With bits 21-29, the PMD can be indexed to get the lowest level page table, just called the PTE.

Finally, bits 12-20 of the virtual address will, when used to index into the PTE, yield the physical address of the actual page containing the data. The lowest twelve bits of the virtual address are the offset into the page itself.

As suggested previously, not all systems run with four levels of page tables. 32-Bit systems use three or even two levels, for example. The memory-management code may be written as if all four levels are present. For example, another level of indirection in the form of a fifth level of page tables. The new level, called the "P4D," may be inserted between the PGD and the PUD.

Thus, as seen in FIG. 2, the page table structure forms a tree, where the leaves are the PTEs, and the other nodes, starting from the root, are, as stated previously, the PGD, the PUDs, the PMDs and the PTEs.

Figures 3, 4:
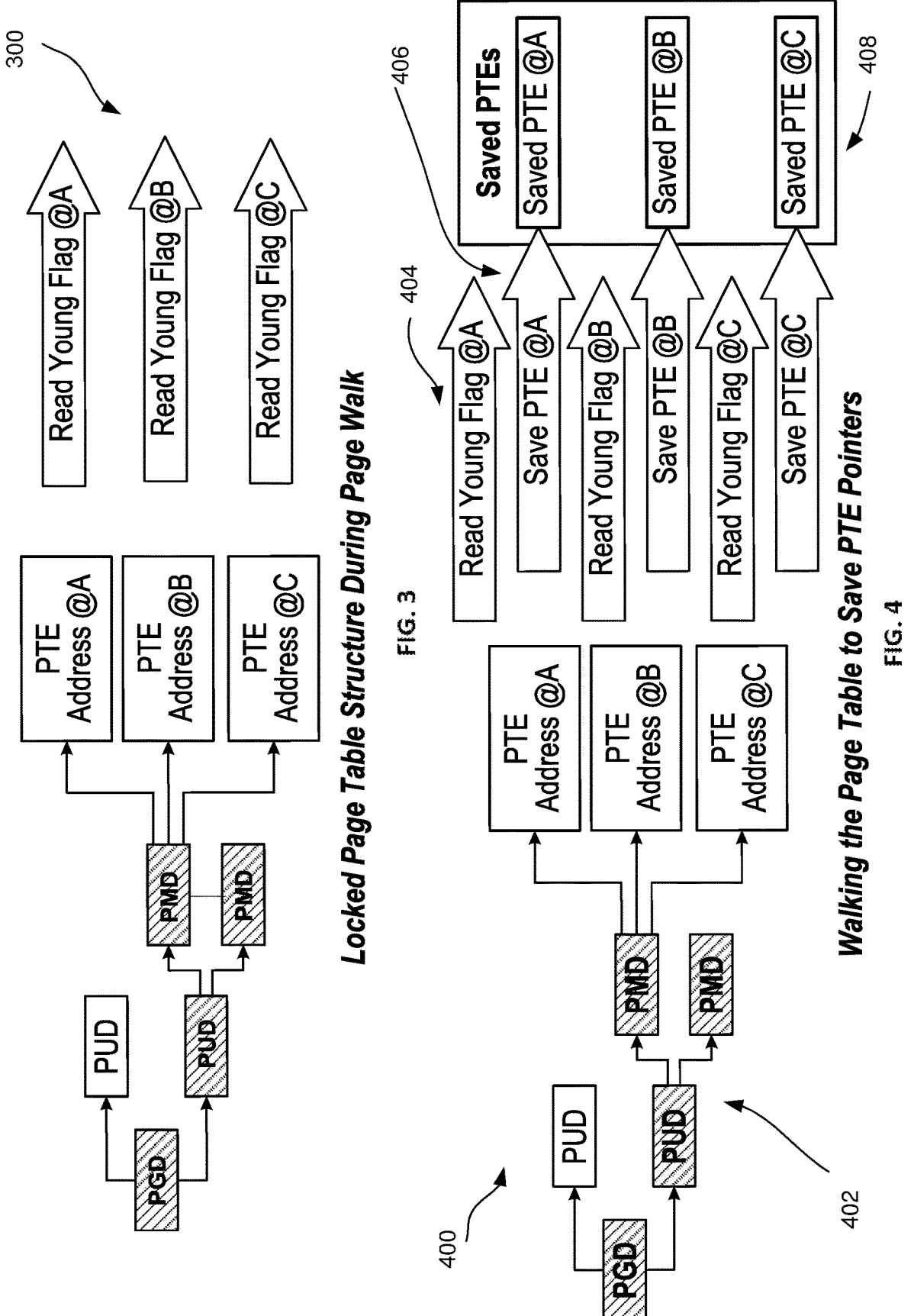
FIG. 3 illustrates a flow for obtaining page table entry (PTE) metadata based on existing mechanisms.
FIG. 4 illustrates an example flow for obtaining PTE metadata according to some embodiments.

Reference is now made to FIG. 3, which shows a flow 300 to obtain PTE metadata (in the shown example in the form of young flags) for PTEs that correspond to a workflow identified as a result of a page walk, such as a page walk as depicted in FIG. 2. As noted previously, with existing solutions, sampling accesses to the pages requires walking through the page table structure of the pooled memory, such as through a structure similar to structure 200 of FIG. 2, to identify those PTEs corresponding to a workload that resulted in a memory request involving the pooled memory. Sampling PTEs in existing solutions requires walking the entire page table structure every time sampling is required, as shown by tree 202 in FIG. 2.

The different regions of a memory pool corresponding to a workload to be executed by a local compute node, such as compute node 102, can be located in in different devices/different compute nodes (in a pooled memory architectures as explained in the context of FIG. 1). Therefore a page walk is to typically occur at page granularity, that is, at the PTE level granularity relating to the pages themselves where the data relevant to the workload is located. The page walk, to be performed for example by a control circuitry of a local compute node, such as memory controller circuitry, is to allow determination all of the pages associated with a given process or workload through corresponding pointers to an address space for the pooled memory. The page walk, based on existing hardware, typically involves exploring the entirety of the page table structure to identify PTEs relevant to a workload to be executed by a processor of a local compute node, such as a given one of the compute nodes 102 of FIG. 1 that is to execute the workload.

During a page walk, every time the memory controller identifies a PTE relevant to a workload to be executed, it may execute a sampling operation on the PTE, namely to determine PTE metadata, such as a young flag, to verify whether a page associated with that PTE has been accessed since the last time the control circuitry executed a sampling operation for that PTE. With regard to the latter, reference is made to the PTE address read operations 304 performed on multiple PTEs associated with a workload to be executed. Thus, according to existing mechanisms, a page walk and a sampling operation occur together and at the same frequency (i.e. every time a sampling operation occurs, a page walk is occurring).

A determination, for example by a processor of a local compute node, such as CPU of compute node 102, that an access frequency of a given page (the number of times the page has been accessed) is above a hotness threshold, may result in the processor moving the page to a different physical memory location within the pooled memory, such as to the local memory 130. A determination, for example by a processor of a local compute node, such the CPU of compute node 102, that an access frequency of a given page (the number of times the page has been accessed) is below a coldness threshold, may result in the processor moving the page to a different memory location within the pooled memory, such as to the remote memory.

The operating system of the local compute node executed on the CPU may need information regarding access frequencies of memory pages corresponding to a workload to be executed in order to optimize a physical location of those memory pages based on the hotness or the coldness of a given page corresponding to a PTE. For a given page, its corresponding PTE may provide access frequency information, for example in the form of a young flag that is part of the PTE metadata. In existing mechanisms, a page walk of the page table structure provides access to PTEs and hence makes it possible for a memory controller to access young flags for the PTEs corresponding to the workload to be executed. The latter in turn makes the optimization of physical memory location for given memory pages possible at the local compute node. Optimization of physical memory location may be performed by the operating system running on a processor of a local compute node. During optimization, pages that are predicted, based on their young flags for example, to be likely to be accessed frequently in future executions of the workload (hot pages) may be placed in the local or system memory of local compute node 102, where the latency of memory access for workload execution is low, and where the bandwidth for memory access is high. On the other hand, similarly, during optimization, pages that are predicted, based on their young flags for example, to be likely to be accessed infrequently in future executions of the workload (cold pages) may be placed in a remote memory, where latency of access is higher and communication bandwidth for memory access lower.

Thus memory placement optimization in current mechanisms relies on the proper determination of the of the access frequency during a page walk.

The page walks that are necessary to allow sampling operations disadvantageously introduce overhead on workload performance for a number of reasons. For example, page table structures that are the subject of a page walk must be locked at certain nodes thereof (for example at the nodes indicated in FIGS. 4 and 5 by cross hatchings—these are, in the shown example, corresponding to page table structure nodes relevant to the workload to be executed) during a page walk to other running workloads to prevent mutual access. Because a page walk must occur in existing solutions every time sampling is needed to read PTE metadata, such as young flags for memory placement optimization, some or all nodes within page table structures in pooled memory may be locked to some running workloads in a manner that affects their performance by adding latency and inefficiencies to the same.

Some embodiments solve the above problem by providing control circuitry within a local compute node, such as memory controller 110, that is adapted to perform a page walk through the page table structure of pooled memory to determine PTEs corresponding to a workload to be executed by the local compute node, and to perform, during a time interval not including another page walk through the page table structure, one or more sampling operations to determine PTE metadata corresponding to the PTEs.

Reference is now made to FIG. 4, which shows a flow 400 to obtain PTE metadata (in the shown example in the form of young flags) for PTEs that correspond to a workflow and that are identified as a result of an initial page walk, such as the page walk of FIG. 2. FIG. 4 is a flow according to some embodiments.

Some embodiments, as depicted by way of example in FIG. 4, split the page walk operation 402 from a sampling operation, which may occur after a reading of PTE metadata at operation 404 based on a page walk 402, and, notably, after a saving of PTE information, at operation 406, for PTEs that correspond to the workflow to be executed. The saved PTE information may be located in the local memory in a memory structure 408.

According to some embodiments, control circuitry within the local compute node, such as memory controller circuitry, may perform a page walk operation to identify PTEs corresponding to a workload to be executed, for example at operation 402. The control circuitry may cause information regarding the PTEs to be saved in local memory 408, as shown for example in operation 406. Subsequent to saving the information regarding the PTEs in local memory, the control circuitry may, using the information, perform one or more sampling operations on the saved PTEs to determine PTE metadata therefrom, and may thereafter send the PTE metadata to a processor of the compute node, such as to a CPU of the compute node, to optimize memory placement within the memory pool based on the sampling operations.

The information regarding the PTEs (or PTE information) that may be saved according to some embodiments may include tracking information regarding the PTEs, that is, information that would allow locating or tracking the PTE in the page table structure. The information regarding the PTEs may for example include at least one of PTE start and end addresses for each of the PTEs, a pointer to the PTEs within the page table structure, pointers to the memory context of the workload to be executed, and a process identifier for the workload to be executed (process ID). Saving this information allows a memory controller to, next time the workload with a given process ID is to be executed, readily access the page table structure and the relevant PTEs for that process ID without a page walk, and read the PTE metadata from the thus accessed PTEs.

Operation 406, the saving of PTE information, is to take place after a walk of the page table structure (operation 402) is triggered. Besides reading PTE metadata as part of the page walk 402, at operation 404, information about each PTE may be saved in a new memory structure. The flow of a page walk and saving of PTE metadata for relevant PTEs (those identified as corresponding to a workflow to be executed) may occur at least once before any other operations (such as metadata reading operation 404 or the saving operation 406) in order to explore all PTEs for a given workflow to be executed. Saving the PTEs requires walking the page table structure, thus locking some structures which impact the workload execution. However, PTEs are stable compared to page accesses, so the page walk to save PTEs does not need to happen often, and can happen, according to some embodiments, only once in a while.

After saving of PTE information has occurred, for example according to operation 406, sampling of the PTEs whose information was saved may occur, and such sampling may occur, according to some embodiments, at a frequency $f_{sampling}$ which is higher than a frequency of saving PTE information, which frequency, according to some embodiments, corresponds to a frequency of page walks, $f_{pagewalk}$. During a sampling operation, memory controller circuitry, such as memory controller circuitry, may read metadata (such as page flags, e.g. young flags for hotness detection) from each PTE that corresponds to a workload to be executed. Thanks to the PTE information saved in the new memory structure 402, information to explore PTEs (e.g. PTE pointers to the right PTEs) is already known and no page walk is required to access the right PTEs. It is now possible to sample the PTEs without having to lock any of the page table structures, hence removing overhead on workload execution.

After PTE information is saved, for example at operation 406, it may be used for multiple sampling operations with no page walk for a given workload, where the sampling operations are based on the saved PTE information to locate and access the PTEs that pertain to the workload to be executed. The combination page walk and saving operation, either happening partially concurrently may be performed intermittently as a refresh operation, either at regular intervals, triggered by one or more external factors/signals, or at random intervals, or based on the workload to be executed. The refresh operation is to keep the saved PTE information synchronized with the information in the pooled memory. Depending on the workload to be executed, the lifespan of PTE information (e.g. PTE pointer) can be relatively long in comparison to page flags values, as those may be modified by the workload even if no more memory is dynamically allocated or deallocated for data associated with the workload to be executed. In the case of determining the page accesses therefore, sampling the page young flag of known PTEs must happen frequently. Therefore, $f_{sampling} > f_{saving}$.

Figure 5:
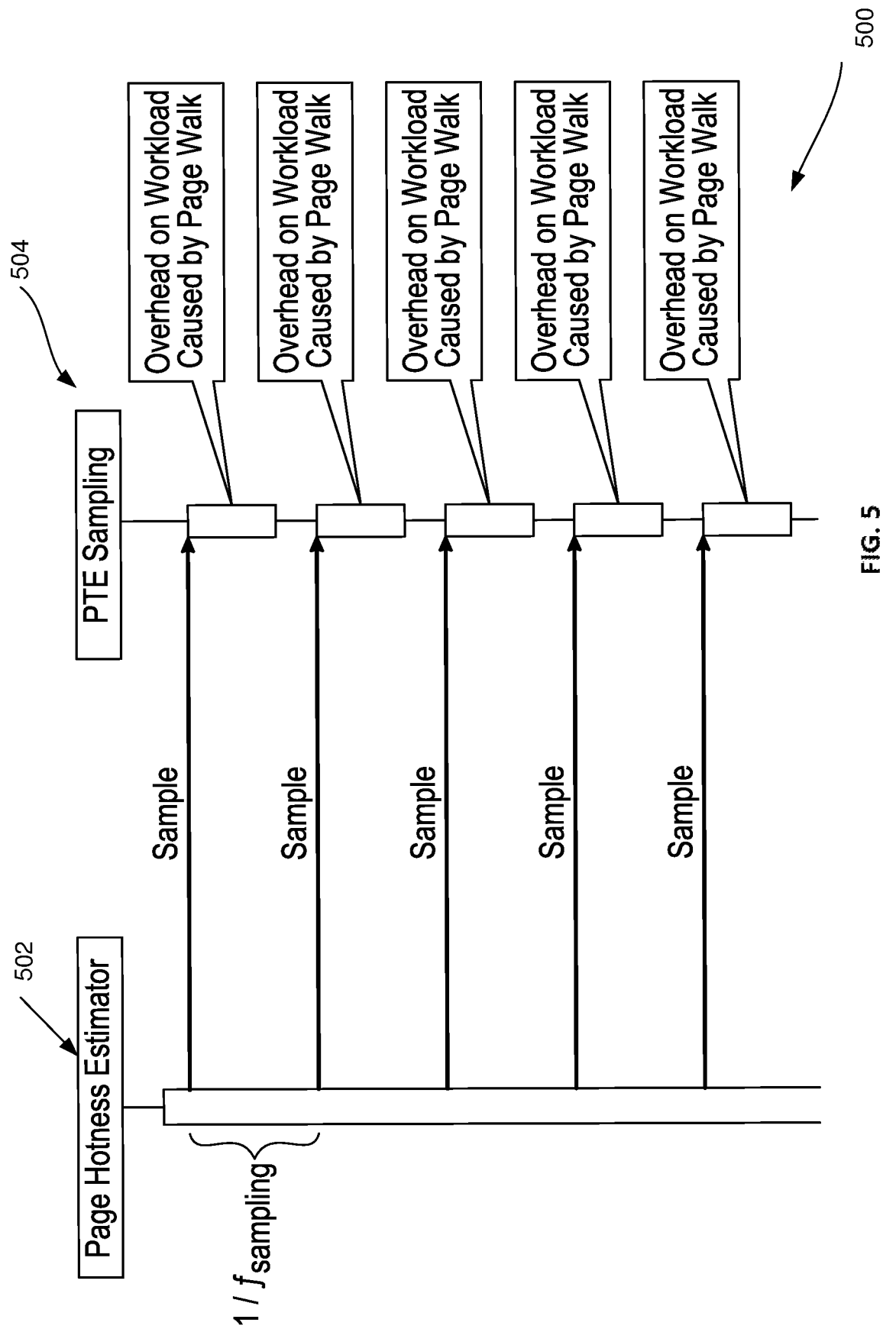
FIG. 5 illustrates a flow for page hotness estimation based on existing mechanisms.

Reference is now made to FIG. 5, which shows a flow 500 for page hotness estimation in existing approaches. As noted previously, sampling in existing approaches requires a page walk each time sampling is to be performed, which creates overhead and negatively impacts workload execution because of page locking. Therefore, for page hotness estimation by page hotness estimator 502, $f_{sampling} = f_{pagewalk}$, a high frequency with overhead on page locking each time sampling is performed by the PTE sampling agent 504.

Figure 6:
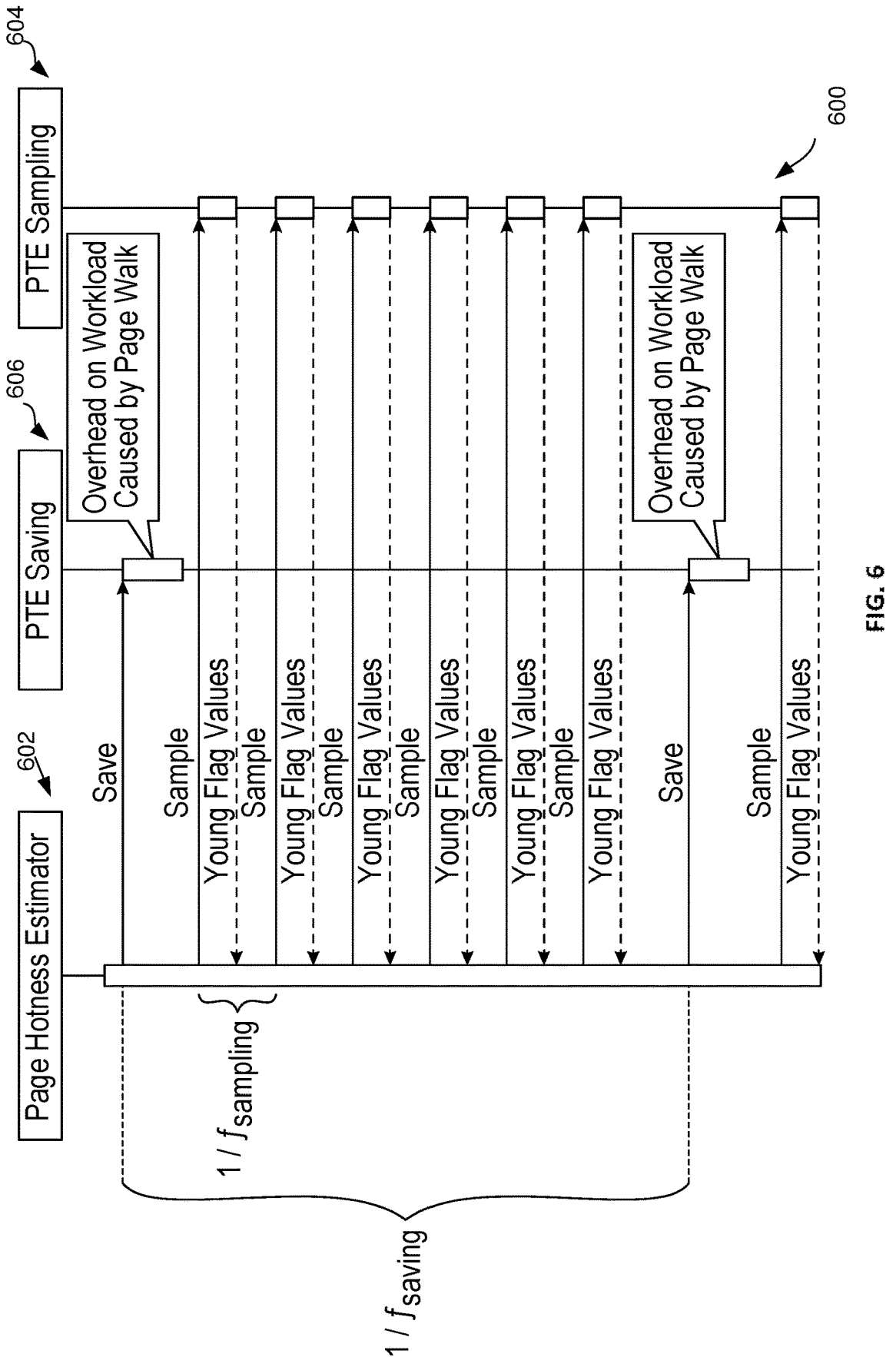
FIG. 6 illustrates an example flow for page hotness estimation according to some embodiments.

Reference is now made to FIG. 6, which shows a flow 600 for page hotness estimation in an embodiment. Sampling according to some embodiments avoids a page walk each time a PTE sampling is to be performed, which avoids overhead and speeds up workload execution because of it avoids page locking. Therefore, for page hotness estimation by page hotness estimator 602 according to some embodiments, $f_{sampling} > f_{pagewalk}$. Because PTE information is saved by PTE saving agent 606, PTE sampling by sampling agent 604 may occur at a higher frequency than a frequency of page walks. Therefore, some embodiments allow a reduction of the overhead on workload execution while maintaining the same sampling frequency as previously. The reduction depends on the ratio $f_{sampling}/f_{saving}$. FIG. 6 further shows, as noted previously, that the page walk and saving operation may be performed intermittently as a refresh operation, for example at operation 610, either at regular intervals, triggered by one or more external factors/signals, or at random intervals, or based on the workload to be executed. The refresh operation 610, after the initial page walk and saving operation 601, is to keep the saved PTE information synchronized with the information in the pooled memory.

Some embodiments advantageously allow determination of PTE metadata, such as page access frequency, in a non-intrusive way, as PTE sampling does not require page table locking thanks to a new structure containing pointers to known PTEs. Embodiments can further be applied to reduce overhead on workload by any method which relies on walking all PTEs of a process to sample metadata or page flags.

FIG. 7 illustrates a flow 700 by an apparatus of a computing system to sample PTEs in accordance with certain embodiments. At operation 702, the process includes performing a page walk operation on a page table structure of a pooled memory; at operation 704, the process includes, based on the page walk operation, determining page table entries (PTEs) corresponding to a workload to be executed by the computing system; and at operation 706, the process includes, during a time interval not including a page walk operation by the control circuitry, performing a plurality of sampling operations, individual ones of the sampling operations including determining PTE metadata corresponding to at least some of the PTEs.

The computing system may include a local platform, such as local platform 102. The apparatus may include control circuitry, for example memory controller circuitry, for example, a MMU 212 of a memory controller circuitry.

The flow described in FIG. 7 is merely representative of operations that may occur in particular embodiments. Some of the operations illustrated in the figures may be repeated, combined, modified, or deleted where appropriate. Additionally, operations may be performed in any suitable order without departing from the scope of particular embodiments.

Although the drawings depict particular computing systems, the concepts of various embodiments are applicable to any suitable computing systems. Examples of systems in which teachings of the present disclosure may be used include desktop computing systems, server computing systems, storage systems, handheld devices, tablets, other thin notebooks, system on a chip (SOC) devices, and embedded applications. Some examples of handheld devices include cellular phones, digital cameras, media players, personal digital assistants (PDAs), and handheld PCs. Embedded applications may include microcontrollers, digital signal processors (DSPs), SOCs, network computers (NetPCs), set-top boxes, network hubs, wide area networks (WANs) switches, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising one or more computing devices.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable storage medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the functionality of the various components displayed in the figures or other entity or component described herein, or subcomponents of any of these. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computing systems have been used. For example, the decimal number ten may also be represented as a binary value of 1010 and a hexadecimal letter A. Therefore, a value includes any representation of information capable of being held in a computing system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, e.g. reset, while an updated value potentially includes a low logical value, e.g. set. Note that any combination of values may be utilized to represent any number of states.

The embodiments of methods, hardware, software, firmware, or code set forth above may be implemented via instructions or code stored on a machine-accessible, machine readable, computer accessible, or computer readable medium which are executable by a processing element. A non-transitory machine-accessible/readable medium includes any mechanism that provides (e.g., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a The machine-readable storage medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage medium used in the transmission of information over the Internet via electrical, optical, acoustical or other forms of propagated signals (e.g., carrier waves, infrared signals, digital signals, etc.). Accordingly, the computer-readable medium includes any type of tangible machine-readable storage medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

EXAMPLES

Some non-limiting examples for some embodiments are provided below.

Example 1 includes an apparatus of a computing system, the apparatus including control circuitry to: perform a page walk operation on a page table structure of a pooled memory; based on the page walk operation, determine page table entries (PTEs) corresponding to a workload to be executed by the computing system; and during a time interval not including a page walk operation by the control circuitry, perform a plurality of sampling operations, individual ones of the sampling operations including determining PTE metadata corresponding to at least some of the PTEs.

Example 2 includes the subject matter of Example 1, the control circuitry to further, after determining the PTEs, cause information regarding the PTEs to be saved at a memory location, wherein performing a plurality of sampling operations includes accessing the memory location, determining the information regarding the PTEs from the memory location, and accessing the PTEs in the page table structure based on the information regarding the PTEs.

Example 3 includes the subject matter of Example 2, wherein the memory location includes a system memory of the computing system.

Example 4 includes the subject matter of any one of Examples 2-3, wherein the page walk is a first page walk, the information regarding the PTEs is first information regarding the PTEs, the plurality of sampling operations are a first plurality of sampling operations, and the PTE metadata is first PTE metadata, the control circuitry to further; perform a refresh operation by, after the time interval, performing a second page walk; after performing the second page walk, cause second information regarding the PTEs to be saved at the memory location; and during a time interval not including any page walk of the page table structure by the control circuitry, perform a second plurality of sampling operations.

Example 5 includes the subject matter of any one of Examples 2-4, wherein the control circuitry is to cause information regarding different sets of PTEs to be saved to the memory location based on different corresponding sets of workloads to be performed by the computing system.

Example 6 includes the subject matter of any one of Examples 1-5, wherein the information regarding the PTEs includes, for each of the PTEs, at least one of: a PTE start address and a PTE end address or a pointer to the PTE within the page table structure.

Example 7 includes the subject matter of Example 6, wherein the information regarding the PTEs includes a pointer to a memory context of the workload to be executed, and a process identifier for the workload to be executed (process ID).

Example 8 includes the subject matter of any one of Examples 1-7, wherein the PTE metadata includes, for each of the PTEs, one or more page flags including at least one of a young flag, a dirty flag, a read flag, a write flag or a present flag.

Example 9 includes the subject matter of any one of Examples 1-8, the control circuitry to further send the PTE metadata to a processor of the computing system, the PTE metadata including information to allow the processor to change memory placement of data in the pooled memory, the data corresponding to the PTEs.

Example 10 includes the subject matter of Example 9, the control circuitry to further detect at least one of a request for page hotness estimation or a request for execution of a workflow, and, based on the request, trigger performance of the page walk.

Example 11 includes a computing system including: a memory; and control circuitry coupled to the memory, the control circuitry to: perform a page walk operation on a page table structure of a pooled memory; based on the page walk operation, determine page table entries (PTEs) corresponding to a workload to be executed by the computing system; and during a time interval not including a page walk operation by the control circuitry, perform a plurality of sampling operations, individual ones of the sampling operations including determining PTE metadata corresponding to at least some of the PTEs.

Example 12 includes the subject matter of Example 11, the control circuitry to further, after determining the PTEs, cause information regarding the PTEs to be saved at the memory, wherein performing a plurality of sampling operations includes accessing the memory, determining the information regarding the PTEs from the memory, and accessing the PTEs in the page table structure based on the information regarding the PTEs.

Example 13 includes the subject matter of Example 12, wherein the memory includes a system memory of the computing system.

Example 14 includes the subject matter of any one of Examples 12-13, wherein the page walk is a first page walk, the information regarding the PTEs is first information regarding the PTEs, the plurality of sampling operations are a first plurality of sampling operations, and the PTE metadata is first PTE metadata, the control circuitry to further; perform a refresh operation by, after the time interval, performing a second page walk; after performing the second page walk, cause second information regarding the PTEs to be saved at the memory; and during a time interval not including any page walk of the page table structure by the control circuitry, perform a second plurality of sampling operations.

Example 15 includes the subject matter of any one of Examples 11-14, wherein the control circuitry is to cause information regarding different sets of PTEs to be saved to the memory based on different corresponding sets of workloads to be performed by the computing system.

Example 16 includes the subject matter of any one of Examples 11-15, wherein the information regarding the PTEs includes, for each of the PTEs, at least one of: a PTE start address and a PTE end address or a pointer to the PTE within the page table structure.

Example 17 includes the subject matter of Example 16, wherein the information regarding the PTEs includes a pointer to a memory context of the workload to be executed, and a process identifier for the workload to be executed (process ID).

Example 18 includes the subject matter of any one of Examples 11-17, wherein the PTE metadata includes, for each of the PTEs, one or more page flags including at least one of a young flag, a dirty flag, a read flag, a write flag or a present flag.

Example 19 includes the subject matter of any one of Examples 11-18, further including a processor, the control circuitry to further send the PTE metadata to the processor, the PTE metadata including information to allow the processor to change memory placement of data in the pooled memory, the data corresponding to the PTEs.

Example 20 includes the subject matter of Example 19, the control circuitry to further detect at least one of a request for page hotness estimation or a request for execution of a workflow, and, based on the request, trigger performance of the page walk.

Example 21 includes a method to be performed at a control circuitry of a computing system, the method including: performing a page walk operation on a page table structure of a pooled memory; based on the page walk operation, determining page table entries (PTEs) corresponding to a workload to be executed by the computing system; and during a time interval not including a page walk operation by the control circuitry, performing a plurality of sampling operations, individual ones of the sampling operations including determining PTE metadata corresponding to at least some of the PTEs.

Example 22 includes the subject matter of Example 21, further including, after determining the PTEs, causing information regarding the PTEs to be saved at a memory location, wherein performing a plurality of sampling operations includes accessing the memory location, determining the information regarding the PTEs from the memory location, and accessing the PTEs in the page table structure based on the information regarding the PTEs.

Example 23 includes the subject matter of Example 22, wherein the memory location includes a system memory of the computing system.

Example 24 includes the subject matter of any one of Examples 22-23, wherein the page walk is a first page walk, the information regarding the PTEs is first information regarding the PTEs, the plurality of sampling operations are a first plurality of sampling operations, and the PTE metadata is a first PTE metadata, the method further including; performing a refresh operation by, after the time interval, performing a second page walk; after performing the second page walk, causing second information regarding the PTEs to be saved at the memory location; and during a time interval not including any page walk of the page table structure by the control circuitry, performing a second plurality of sampling operations.

Example 25 includes the subject matter of any one of Examples 22-24, further including causing information regarding different sets of PTEs to be saved to the memory location based on different corresponding sets of workloads to be performed by the computing system.

Example 26 includes the subject matter of any one of Examples 21-25, wherein the information regarding the PTEs includes, for each of the PTEs, at least one of: a PTE start address and a PTE end address or a pointer to the PTE within the page table structure.

Example 27 includes the subject matter of Example 26, wherein the information regarding the PTEs includes a pointer to a memory context of the workload to be executed, and a process identifier for the workload to be executed (process ID).

Example 28 includes the subject matter of any one of Examples 21-27, wherein the PTE metadata includes, for each of the PTEs, one or more page flags including at least one of a young flag, a dirty flag, a read flag, a write flag or a present flag.

Example 29 includes the subject matter of any one of Examples 21-28, the method further including sending the PTE metadata to a processor of the computing system, the PTE metadata including information to allow the processor to change memory placement of data in the pooled memory, the data corresponding to the PTEs.

Example 30 includes the subject matter of Example 29, the method further including detecting at least one of a request for page hotness estimation or a request for execution of a workflow, and, based on the request, trigger performance of the page walk.

Example 31 includes at least one non-transitory machine readable storage medium having instructions stored thereon, the instructions, when executed by a machine to cause the machine to perform operations including: performing a page walk operation on a page table structure of a pooled memory; based on the page walk operation, determining page table entries (PTEs) corresponding to a workload to be executed by the computing system; and during a time interval not including a page walk operation by the control circuitry, performing a plurality of sampling operations, individual ones of the sampling operations including determining PTE metadata corresponding to at least some of the PTEs.

Example 32 includes the subject matter of Example 31, the operations further including, after determining the PTEs, causing information regarding the PTEs to be saved at a memory location, wherein performing a plurality of sampling operations includes accessing the memory location, determining the information regarding the PTEs from the memory location, and accessing the PTEs in the page table structure based on the information regarding the PTEs.

Example 33 includes the subject matter of Example 32, wherein the memory location includes a system memory of the computing system.

Example 34 includes the subject matter of any one of Examples 32-33, wherein the page walk is a first page walk, the information regarding the PTEs is first information regarding the PTEs, the plurality of sampling operations are a first plurality of sampling operations, and the PTE metadata is a first PTE metadata, the operations further including; performing a refresh operation by, after the time interval, performing a second page walk; after performing the second page walk, causing second information regarding the PTEs to be saved at the memory location; and during a time interval not including any page walk of the page table structure by the control circuitry, performing a second plurality of sampling operations.

Example 35 includes the subject matter of any one of Examples 32-34, the operations further including causing information regarding different sets of PTEs to be saved to the memory location based on different corresponding sets of workloads to be performed by the computing system.

Example 36 includes the subject matter of any one of Examples 31-35, wherein the information regarding the PTEs includes, for each of the PTEs, at least one of: a PTE start address and a PTE end address or a pointer to the PTE within the page table structure.

Example 37 includes the subject matter of Example 36, wherein the information regarding the PTEs includes a pointer to a memory context of the workload to be executed, and a process identifier for the workload to be executed (process ID).

Example 38 includes the subject matter of any one of Examples 31-37, wherein the PTE metadata includes, for each of the PTEs, one or more page flags including at least one of a young flag, a dirty flag, a read flag, a write flag or a present flag.

Example 39 includes the subject matter of any one of Examples 31-38, the operations further including sending the PTE metadata to a processor of the computing system, the PTE metadata including information to allow the processor to change memory placement of data in the pooled memory, the data corresponding to the PTEs.

Example 40 includes the subject matter of Example 39, the operations further including detecting at least one of a request for page hotness estimation or a request for execution of a workflow, and, based on the request, trigger performance of the page walk.

What is claimed is:

1. An apparatus of a computing system, the apparatus including control circuitry to:

perform a page walk operation on a page table structure of a pooled memory;

based on the page walk operation, determine page table entries (PTEs) corresponding to a workload to be executed by the computing system; and during a time interval not including a page walk operation by the control circuitry, perform a plurality of sampling operations, individual ones of the sampling operations including determining PTE metadata corresponding to at least some of the PTEs.

2. The apparatus of claim 1, the control circuitry to further, after determining the PTEs, cause information regarding the PTEs to be saved at a memory location of the computing system, wherein performing a plurality of sampling operations includes accessing the memory location, determining the information regarding the PTEs from the memory location, and accessing the PTEs in the page table structure based on the information regarding the PTEs.

3. The apparatus of claim 2, wherein the page walk is a first page walk, the information regarding the PTEs is first information regarding the PTEs, the plurality of sampling operations are a first plurality of sampling operations, and the PTE metadata is first PTE metadata, the control circuitry to further;

perform a refresh operation by, after the time interval, performing a second page walk;

after performing the second page walk, cause second information regarding the PTEs to be saved at the memory location; and during a time interval not including any page walk of the page table structure by the control circuitry, perform a second plurality of sampling operations.

4. The apparatus of claim 2, wherein the control circuitry is to cause information regarding different sets of PTEs to be saved to the memory location based on different corresponding sets of workloads to be performed by the computing system.

5. The apparatus of claim 2, wherein the information regarding the PTEs includes, for each of the PTEs, at least one of: a PTE start address and a PTE end address or a pointer to the PTE within the page table structure.

6. The apparatus of claim 5, wherein the information regarding the PTEs includes a pointer to a memory context of the workload to be executed, and a process identifier for the workload to be executed (process ID).

7. The apparatus of claim 1, wherein the PTE metadata includes, for each of the PTEs, one or more page flags including at least one of a young flag, a dirty flag, a read flag, a write flag or a present flag.

8. The apparatus of claim 1, the control circuitry to further send the PTE metadata to a processor of the computing system, the PTE metadata including information to allow the processor to change memory placement of data in the pooled memory, the data corresponding to the PTEs.

9. The apparatus of claim 8, the control circuitry to further detect at least one of a request for page hotness estimation or a request for execution of a workflow, and, based on the request, trigger performance of the page walk.

10. A computing system including:

a memory; and control circuitry coupled to the memory, the control circuitry to:

perform a page walk operation on a page table structure of a pooled memory;

based on the page walk operation, determine page table entries (PTEs) corresponding to a workload to be executed by the computing system; and during a time interval not including a page walk operation by the control circuitry, perform a plurality of sampling operations, individual ones of the sampling operations including determining PTE metadata corresponding to at least some of the PTEs.

11. The computing system of claim 10, the control circuitry to further, after determining the PTEs, cause information regarding the PTEs to be saved at the memory, wherein performing a plurality of sampling operations includes accessing the memory, determining the information regarding the PTEs from the memory, and accessing the PTEs in the page table structure based on the information regarding the PTEs.

12. The computing system of claim 11, wherein the memory includes a system memory of the computing system.

13. The computing system of claim 11, wherein the page walk is a first page walk, the information regarding the PTEs is first information regarding the PTEs, the plurality of sampling operations are a first plurality of sampling operations, and the PTE metadata is first PTE metadata, the control circuitry to further;

perform a refresh operation by, after the time interval, performing a second page walk;

after performing the second page walk, cause second information regarding the PTEs to be saved at the memory; and during a time interval not including any page walk of the page table structure by the control circuitry, perform a second plurality of sampling operations.

14. A method to be performed at a control circuitry of a computing system, the method including:

performing a page walk operation on a page table structure of a pooled memory;

based on the page walk operation, determining page table entries (PTEs) corresponding to a workload to be executed by the computing system; and during a time interval not including a page walk operation by the control circuitry, performing a plurality of sampling operations, individual ones of the sampling operations including determining PTE metadata corresponding to at least some of the PTEs.

15. The method of claim 14, further including, after determining the PTEs, causing information regarding the PTEs to be saved at a memory location of the computing system, wherein performing a plurality of sampling operations includes accessing the memory location, determining the information regarding the PTEs from the memory location, and accessing the PTEs in the page table structure based on the information regarding the PTEs.

16. At least one non-transitory machine readable storage medium having instructions stored thereon, the instructions, when executed by an apparatus of a computing system to cause the apparatus to perform operations including:

performing a page walk operation on a page table structure of a pooled memory;

based on the page walk operation, determining page table entries (PTEs) corresponding to a workload to be executed by the computing system;

and during a time interval not including any page walk, performing a plurality of sampling operations, individual ones of the sampling operations including determining PTE metadata corresponding to at least some of the PTEs.

17. The storage medium of claim 16, the operations further including, after determining the PTEs, causing information regarding the PTEs to be saved at a memory location, wherein performing a plurality of sampling operations includes accessing the memory location, determining the information regarding the PTEs from the memory location, and accessing the PTEs in the page table structure based on the information regarding the PTEs.

18. The storage medium of claim 17, wherein the memory location includes a system memory of the computing system.

19. The storage medium of claim 17, wherein the page walk is a first page walk, the information regarding the PTEs is first information regarding the PTEs, the plurality of sampling operations are a first plurality of sampling operations, and the PTE metadata is a first PTE metadata, the operations further including;

performing a refresh operation by, after the time interval, performing a second page walk;

after performing the second page walk, causing second information regarding the PTEs to be saved at the memory location; and during a time interval not including any page walk of the page table structure by the control circuitry, performing a second plurality of sampling operations.

20. The storage medium of claim 17, the operations further including causing information regarding different sets of PTEs to be saved to the memory location based on different corresponding sets of workloads to be performed by the computing system.

\* \* \* \* \*